Nov. 15, 1938.                W. STEINEN                2,136,643
                        FRAME AND HANDLE ASSEMBLY
                          Filed Nov. 14, 1936
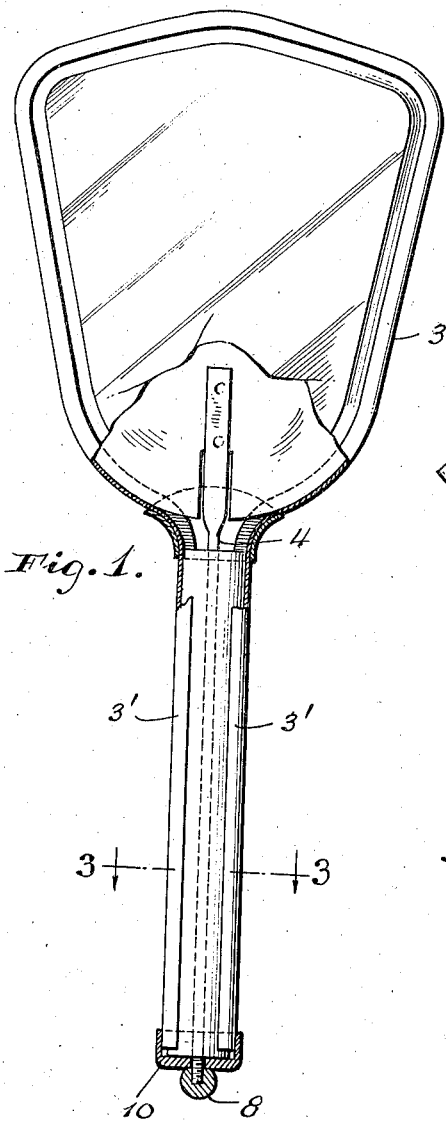
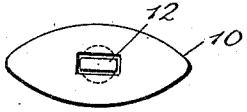
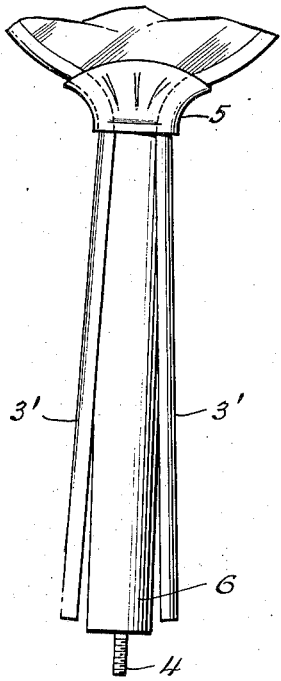
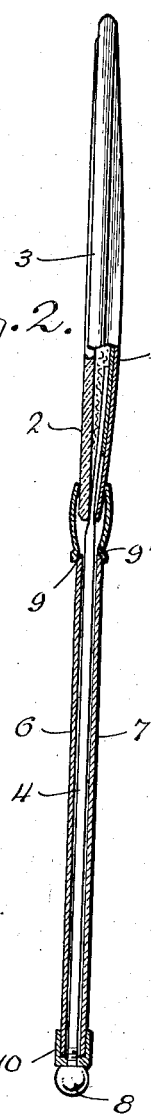
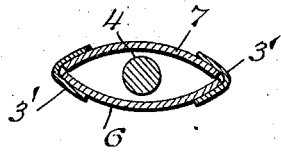
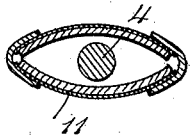
                                                INVENTOR.
                                          WILLIAM STEINEN
                                    BY
                                          Richards & Geier
                                                ATTORNEYS Patented Nov. 15, 1938

2,136,643

UNITED STATES PATENT OFFICE 2,136,643

FRAME AND HANDLE ASSEMBLY

William Steinen, South Orange, N. J.

Application November 14, 1936, Serial No. 110,831

7 Claims. (Cl. 88—102)

This invention relates to a novel construction of frame and handle as used in the manufacture of vanity mirrors, brushes, and the like.

It has been the practice in this art to form the handle of the mirror or brush by two symmetrical shell members, which when placed face-to-face are soldered along their abutting edges. This construction has proved costly, as a soldered seam has to be finished. By my invention the soldered seam has been entirely eliminated and a construction provided which has a very pleasing appearance.

Also it has been found in practice that the junction of the handle with the main back of the mirror was a weak point in the general construction of the article, because of the unbalanced condition of the main back with respect to the handle at this point. Use of the article over a period of time would frequently result in a loosening of the handle relative to the main back.

My invention overcomes these defects by employing an arrangement of main back and handle so interconnected by a strip of channel rim as to form a rigid structure equivalent in all respects to a back and handle made out of one piece.

Furthermore, the handle is made from reinforcing means suitably engaged by the channel rim, giving a handle of substantial strength which cannot spread.

Furthermore, a specially constructed throat piece is arranged to lock the handle member with respect to the main back of the mirror to add strength and rigidity at this critical point. The throat piece is so designed as to aid in the pleasing appearance of the article.

Other objects and advantages of the invention will become apparent as the description proceeds.

My invention as disclosed in a preferred embodiment is illustrated in the accompanying drawing, in which:

Figure 1 is a front elevation, partly in section, of my invention applied to the popular vanity hand mirror.

Fig. 2 is a side elevation, partly in section, of Fig. 1.

Fig. 3 is a sectional view taken through the plane 3—3 of Fig. 1.

Fig. 4 is a detail view in elevation showing the relationship of the throat piece with the handle and the main frame.

Fig. 5 is a view similar to Fig. 3 of a finished handle.

Fig. 6 is a modification of the detail of rod and end cap.

In the embodiment of my invention shown, the metal back 1 is the main support for the mirror 2. A rod 4 attached to the main back 1 extends downwardly and has its lower end threaded to receive the nut 8. A channel rim 3, which is substantially V-shaped in cross section as shown in Fig. 3, extends about the periphery of the main back 1 and the mirror 2. This channel rim 3 terminates in two parallel extensions 3′, 3′, one on each side of the rod 4.

A throat piece 5, open at both ends and flaring upwardly has two indented shoulders 9, 9′ the function of which will be disclosed as the description proceeds.

The handle is formed in the present invention by two bowed metal strips 6, 7. In the finished article these strips, may be covered by a silk material such as 11, or perhaps given a coat of enamel to aid in the appearance of the article.

An end cap 10 is apertured to permit the passage of the end of the threaded rod 4. The cap finishes off the bottom of the handle and also acts as a bearing member for the tightening nut 8. The nut 8 is decorative in design to blend with the appearance of the handle.

In assembling the article, the channel rim 3 is circumscribed about the periphery of the main back 1 and mirror 2, and the terminals of said channel rim assume a position of parallelism on opposite sides of the rod 4. The throat piece 5 is then slipped over the ends of the channel rim terminals 3′, 3′ and is positioned at the junction point as illustrated in Fig. 4. The metal strips 6, 7 are next inserted on opposite sides of the rod 4 with their edges guided by the channel rim terminals. As is evident in Fig. 2 the metal strips are forced upwardly between the channel rim terminals 3′, 3′ until the upper edges of the metal strips 6, 7 are in abutting engagement with the indented shoulders 9, 9′. The end cap 10 is then inserted over the end of the protruding rod 4 so as to engage and enclose the ends of the channel rim members. The nut 8 is then threaded on the rod 4, and the necessary take-up and tightening action is derived thereby.

In some instances it may be desirable to have the rod 12 and the aperture in the end cap 10 of rectangular shape in cross-section as shown in the Fig. 6. The advantage to be derived by this construction is that the likelihood of the handle twisting relative to the rod 12 and its associated frame structure is considerably reduced.

It is evident from the above description that I have invented an arrangement of associating a back and handle structure for vanity hand mirrors and the like, which has the advantages of strength and durability attending similar articles made as a single unit.

It will be understood that various embodiments of the present invention may be possible by those skilled in the art without departing from the spirit of the invention or the scope of the claims as herein recited.

I claim as my invention:

1. In a device of the character described, the combination of a main back, a rod extending therefrom, a channel rim circumscribing the periphery of the main back and terminating in parallel portions adjacent the rod, a throat member surrounding the channel rim at the base of the main back, reinforcing means positioned between the parallel portions of the channel rim and extended into the throat member so as to form a handle, and tightening means associated with the rod and the channel rim, said throat member taking the form of an encircling ferrule and having a top flaring portion closely conforming to the converging portions of said channel rim adjacent said throat and having a lower restricted portion closely contacting with and laterally contracting the upper adjacent sections of said channel portions, serving as additional tightening means to draw said channel rim tightly upon said back and to draw said adjacent sections tightly together at said throat upon the outside edges of said reinforcing means.

2. In a device of the character described, the combination of a main back, a rod extending therefrom, a channel rim circumscribing the periphery of the main back and terminating in parallel portions adjacent the rod, a throat member surrounding the channel rim at the base of the main frame, bowed reinforcing strips positioned between the parallel portions of the channel rim and extended into the throat member so as to form a handle, and tightening means associated with the rod and the channel rim, said throat member taking the form of an encircling ferrule and having a top flaring portion closely conforming to the converging portions of said channel rim adjacent said throat and having a lower restricted portion closely contacting with and laterally contracting the upper adjacent sections of said channel portions, serving as additional tightening means to draw said channel rim tightly upon said back and to draw said adjacent sections tightly together at said throat upon the outside edges of said reinforcing means.

3. In a device of the character described, the combination of a main back, a rod extending therefrom, a channel rim circumscribing the periphery of the main back and terminating in parallel portions adjacent the rod, a throat member having indented shoulders and surrounding the channel rim at the base of the main back, reinforcing means positioned between the parallel portions of the channel rim, and extended into the throat member, in abutting engagement with said shoulders, and tightening means associated with the rod and the channel rim, said throat member taking the form of an encircling ferrule and having a top flaring portion closely conforming to the converging portions of said channel rim adjacent said throat and having a lower restricted portion closely contacting with and laterally contracting the upper adjacent sections of said channel portions, serving as additional tightening means to draw said channel rim tightly upon said back and to draw said adjacent sections tightly together at said throat upon the outside edges of said reinforcing means.

4. In a device of the character described, the combination of a main back, a rod extending therefrom, a channel rim circumscribing the periphery of the main back and terminating in parallel portions adjacent the rod, a throat member surrounding the channel rim at the base of the main frame, reinforcing means positioned between the parallel portions of the channel rim and extended into the throat member to form a handle member, and tightening means including an apertured end cap for engagement over the ends of the channel rim to complete the handle member, said throat member taking the form of an encircling ferrule and having a top flaring portion closely conforming to the converging portions of said channel rim adjacent said throat and having a lower restricted portion closely contacting with and laterally contracting the upper adjacent sections of said channel portions, serving as additional tightening means to draw said channel rim tightly upon said back and to draw said adjacent sections tightly together at said throat upon the outside edges of said reinforcing means.

5. In a device of the character described, the combination of a main back, a rod extending therefrom, a channel rim circumscribing the periphery of the main back and terminating in parallel portions adjacent the rod, an upwardly flaring throat member surrounding the channel rim, at the base of the main back, reinforcing means positioned between the parallel portions of the channel rim and extended into the throat member so as to form a handle, and tightening means associated with the rod and the channel rim, said throat member taking the form of an encircling ferrule and having a top flaring portion closely conforming to the converging portions of said channel rim adjacent said throat and having a lower restricted portion closely contacting with and laterally contracting the upper adjacent sections of said channel portions, serving as additional tightening means to draw said channel rim tightly upon said back and to draw said adjacent sections tightly together at said throat upon the outside edges of said reinforcing means.

6. In a device of the character described, the combination of a main back, a rod extending therefrom, a channel rim circumscribing the periphery of the main back and terminating in parallel portions adjacent the rod, a throat member surrounding the channel rim at the base of the main back, reinforcing means positioned between the parallel portions of the channel rim and extended into the throat member so as to form a handle, and an apertured end cap encasing the ends of the channel rim, and a nut threaded on the end of the rod and bearing against the end cap for tightening purposes, said throat member taking the form of an encircling ferrule and having a top flaring portion closely conforming to the converging portions of said channel rim adjacent said throat and having a lower restricted portion closely contacting with and laterally contracting the upper adjacent sections of said channel portions, serving as additional tightening means to draw said channel rim tightly upon said back and to draw said adjacent sections tightly together at said throat upon the outside edges of said reinforcing means.

7. In a device of the character as set forth in claim 6, in which said rod is rectangular in cross-section to cooperate with a rectangular aperture in the end cap to prevent twisting of the handle.

WILLIAM STEINEN.